| United States Patent [19]
Retief

[11] Patent Number: 4,754,892
[45] Date of Patent: Jul. 5, 1988

[54] CLOSURE FOR A CONTAINER

[76] Inventor: Charles T. Retief, 1 Crane Close, Tokai 7945, South Africa

[21] Appl. No.: 5,620

[22] Filed: Jan. 21, 1987

[30] Foreign Application Priority Data

Jan. 22, 1986 [ZA] South Africa .................. 86/0460

[51] Int. Cl.⁴ .............................................. B65D 53/04
[52] U.S. Cl. .................................... 215/329; 215/350
[58] Field of Search ............... 215/350, 349, 343, 344, 215/329; 264/267, 268

[56] References Cited

U.S. PATENT DOCUMENTS

| 2,072,536 | 3/1937 | Trickey et al. | 215/349 |
| 3,458,077 | 7/1969 | Ryan | 215/329 |
| 4,374,796 | 2/1983 | Ogasawara | 264/267 X |
| 4,485,065 | 11/1984 | Hatakeyama et al. | 264/267 X |
| 4,489,844 | 12/1984 | Breskin | 215/329 |
| 4,674,642 | 6/1987 | Towns et al. | 215/350 X |

FOREIGN PATENT DOCUMENTS

| 464721 | 12/1968 | Switzerland | 215/350 |
| 500388 | 2/1939 | United Kingdom | 215/350 |

Primary Examiner—Donald F. Norton
Attorney, Agent, or Firm—Larson and Taylor

[57] ABSTRACT

A closure for a container which includes a cap comprising an end panel wall, and a cylindrical skirt wall extending from the peripheral edge of the end panel wall. A container opening sealing member is located inside the cap on the inside of the cylindrical skirt wall and adjacent the end panel wall, the sealing member having been formed inside the cylindrical skirt wall against the end panel wall.

7 Claims, 2 Drawing Sheets

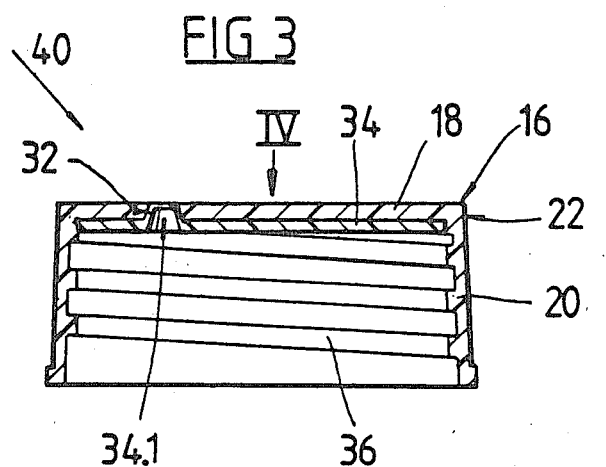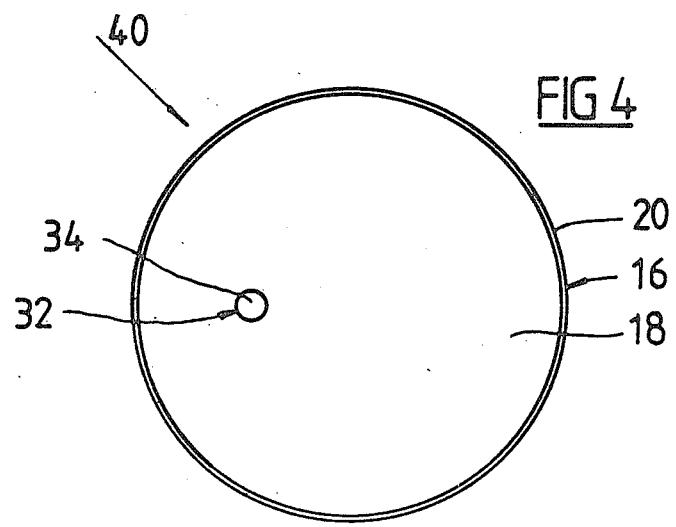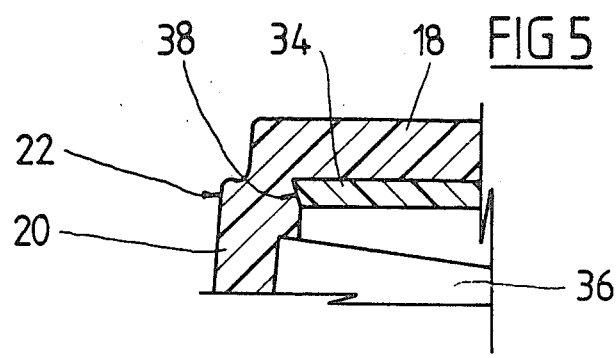

CLOSURE FOR A CONTAINER

FIELD OF THE INVENTION

The present invention relates to closures for containers.

BACKGROUND TO INVENTION

Closures for containers often are provided as a cap having a container opening sealing member, such as a ring- or disc-shaped sealing wad. The sealing wad is manufactured separately from the cap and is inserted into the cap against its end panel wall for sealing off the open end of a container to which it is fitted, such as a bottle.

Many of the known combinations of caps and sealing members suffer from various disadvantages. For instance, the wad at times loosens itself from the cap and falls out. Also the production cost of manufacturing the two parts separately and of inserting the wad into the cap are relatively high.

It is an object of the invention to suggest a different type of closure for a container, which will assist in overcoming the mentioned disadvantages.

SUMMARY OF THE INVENTION

According to the invention, a closure is provided for a container, which includes (a) a cap comprising a disc-shaped end panel wall, and a cylindrical skirt wall extending from the peripheral edge of the end panel wall;

(b) an injection molded sealing member for sealing a container opening, said sealing member being located inside the cap on the inside of the cylindrical skirt wall and adjacent the end panel wall; and (c) a passage in the cap through which the material that forms the sealing member is injection molded into the cap and which is at least partially filled with the material that forms the sealing member.

The passage may be located in the disc-shaped end panel wall.

The passage may be of truncated conical shape.

An annular groove may be provided in the cylindrical skirt wall adjacent the end panel wall, in which groove the sealing member is located.

The annular groove may have an inclined annular wall which is widest at the end panel wall.

An internal thread may be provided on the inner surface of the cylindrical skirt wall, the internal thread being adapted to engage with a complimentary external thread on a mouth neck portion of a container.

The cap and the sealing member may be constituted by different synthetic plastics material, the cap being made of a more rigid material than the sealing member.

BRIEF DESCRIPTION OF DRAWINGS

The invention will now be described by way of example with reference to the accompanying schematic drawings.

In the drawings there is shown in

FIG. 3 a sectional side view through a closure for a container in accordance with the invention;

FIG. 4 a plan view seen along arrow IV in FIG. 1; and

FIG. 5 on a larger scale, a sectional side view through a closure of the cap of FIGS. 3 and 4.

DETAILED DESCRIPTION OF DRAWINGS

Figure 1:
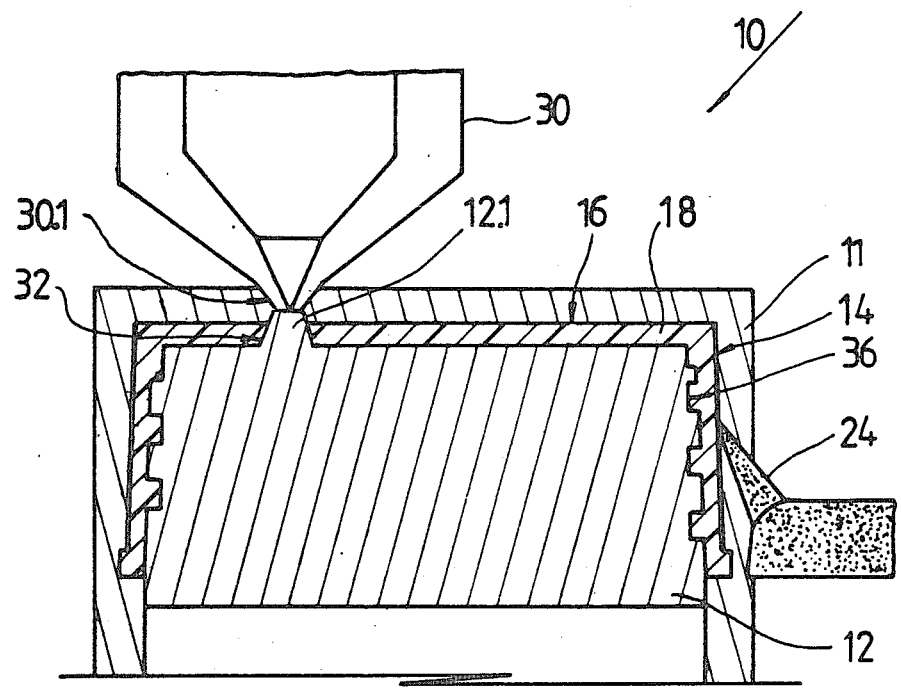
FIG. 1 a sectional side view through a mould defining a cavity for forming a cap for a closure for a container in accordance with the invention and during the stage when the plastics material is injected into the mould for forming the cap.
Figure 2:
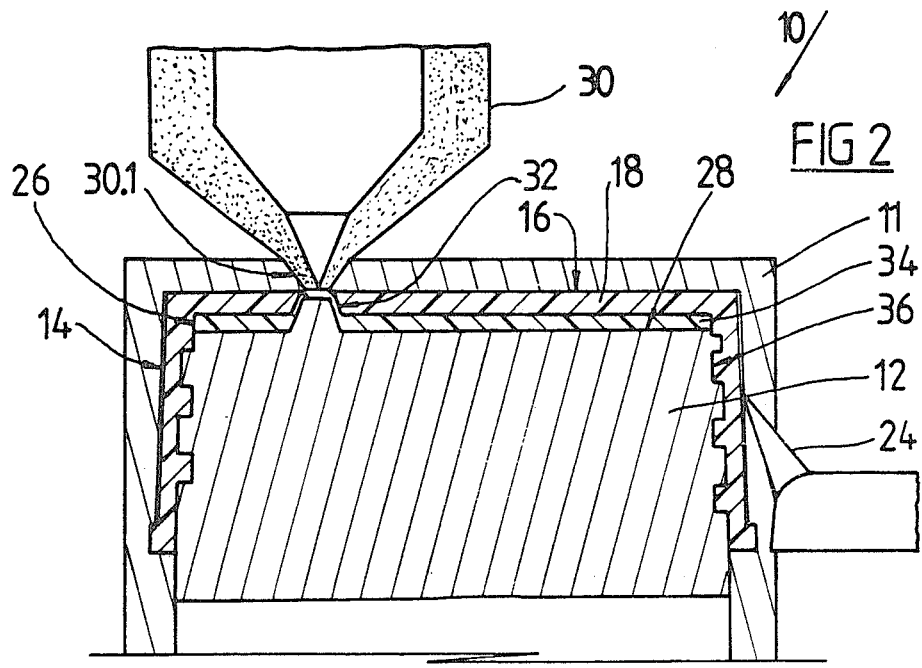
FIG. 2 a view corresponding to FIG. 1 but with the inner core of the mould tool moved away for injection of the plastics material for forming the sealing member.

Referring to FIGS. 1 and 2 the mould 10 for producing a closure in accordance with the invention basically includes an outer mould part 11 and an inner rotatable threaded mould core 11. The mould parts 10 and 12 are merely shown in schematic form without any operating mechanisms, etc.

In the first stage as shown in FIG. 1, the mould 10 is closed so that between the mould part 11 and core 12 a cavity 14 is formed for defining the shape of a cap 16 to be injection moulded therein.

The cap 16, as shown in FIGS. 1 to 4, includes an end panel wall 18 and a cylindrical skirt wall 20 extending downwardly from the peripheral edge 22 of the end panel wall 18. The cap 16 is produced by injecting flowable thermoplastic material through the runner 24 into the cavity 14 (see FIG. 1). The core 12 has a pin 12.1 projecting upwardly from its upper surface. This pin 12.1 closes off the injection orifice 30.1 of the runner 30 by means of which the flowable plastics material for the sealing member is injected as described hereafter. When the cap 16 has been produced and after a suitable time for cooling off, the inner core 12 is rotated (mechanically or hydraulically), so as to move downwardly into the position shown in FIG. 2, thereby reaching the second stage in the production of the closure. Now a space 26 is formed between the upper surface 28 of the core 12 and the lower surface of the end panel wall 18. Also the pin 12.1 has moved out of the end panel wall 18 leaving a passage 32. Another type of flowable synthetic plastics material, which is softer or more resilient than the material of the cap 16, is injected by means of the runner 30 through the orifice 30.1 and the passage 32 into the space 26 to form a disc-shaped sealing member 34. The material also fills the space around the pin 12.1 in the passage 32.

Thereafter, allowing for cooling, the core 12 is moved out fully and the cap 16 is ejected from the mould part 11, which opens in normal manner (details of which are not shown). In the closure as produced the underside of the sealing member 34 will have an indentation 34.1 remaining behind after the withdrawal of the pin 12.1.

As is shown in FIG. 3, an internal thread 36 is provided on the inner surface of the cylindrical skirt wall 20. The internal thread 36 is adapted to be engaged with a complementary external thread on a mouth-neck portion of a container.

Referring to FIG. 5, the cylindrical skirt wall 20 is shown to have an annular groove 38 adjacent the end panel wall 18. The sealing member 34 is located inside this annular groove 38.

The cap 16 may be made of any suitable material, such as polypropylene or high density polyethylene. The sealing member or wad 34 is made of any suitable thermoplastics or rubber material, such as plasticized polyvinyl chloride (PVC) or ethylene vinylacetate (EVA), or a silicon rubber material.

The closure 40 in accordance with the invention is thus constituted by a cap 16 and a sealing member or wad 34 formed inside the cap 16 in such a manner that it cannot be dislocated, and that no additional manual operation or other external operation is required, such as inserting a separately manufactured sealing member into the cap.

I claim:

1. A closure for a container, said closure comprising
   (a) a cap comprising a disc-shaped end panel wall, and a cylindrical skirt wall extending from the peripheral edge of the end panel wall;
   (b) an injection molded sealing member for sealing a container opening, said sealing member being located inside the cap on the inside of the cylindrical skirt wall and adjacent the end panel wall; and
   (c) a passage in the cap through which the material that forms the sealing member is injection molded into the cap and which is at least partially filled with the material that forms the sealing member.

2. A closure as claimed in claim 1, in which the passage is located in the disc-shaped end panel wall.

3. A closure as claimed in claim 1, in which the passage is of truncated conical shape.

4. A closure as claimed in claim 1, in which an annular groove is provided in the cylindrical skirt wall adjacent the end panel wall, in which groove the sealing member is located.

5. A closure as claimed in claim 1, in which the annular groove has an inclined annular wall which is widest at the end panel wall.

6. A closure as claimed in claim 1, in which an internal thread is provided on the inner surface of the cylindrical skirt wall, the internal thread being adapted to engage with a complimentary external thread on a mouth neck portion of a container.

7. A closure as claimed in claim 1, in which the cap and the sealing member are constituted by different synthetic plastics materials, the cap being made of a more rigid material than the sealing member.

* * * * *